United States Patent
Lim et al.

(10) Patent No.: US 10,680,984 B1
(45) Date of Patent: Jun. 9, 2020

(54) PROPENSITY-BASED SMS INVITATION FILTERING

(71) Applicant: Microsoft Technology Licensing, LLC, Redmond, WA (US)

(72) Inventors: Joonhyung Lim, San Jose, CA (US); Yang Zhou, San Jose, CA (US); Michael Maczka, San Jose, CA (US); Haifeng Ji, San Jose, CA (US); Damien Albert Louis Coullon, Mountain View, CA (US); Reza Arbabi, Cupertino, CA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 317 days.

(21) Appl. No.: 15/362,418

(22) Filed: Nov. 28, 2016

(51) Int. Cl.
*H04L 12/58* (2006.01)
*H04W 4/14* (2009.01)

(52) U.S. Cl.
CPC .............. *H04L 51/12* (2013.01); *H04L 51/32* (2013.01); *H04L 51/38* (2013.01); *H04W 4/14* (2013.01)

(58) Field of Classification Search
None
See application file for complete search history.

(56) References Cited

U.S. PATENT DOCUMENTS

| | | | | |
|---|---|---|---|---|
| 2006/0092895 A1* | 5/2006 | Kim | ...................... | H04L 63/102 370/338 |
| 2007/0286388 A1* | 12/2007 | Vaught | .................... | H04M 3/56 379/202.01 |
| 2008/0160980 A1* | 7/2008 | Harris | ...................... | H04M 3/56 455/418 |
| 2011/0289011 A1* | 11/2011 | Hull | ...................... | G06Q 10/107 705/319 |
| 2014/0164525 A1* | 6/2014 | Malik | ...................... | H04L 51/32 709/206 |
| 2014/0378108 A1* | 12/2014 | DeLuca | ................ | H04M 3/565 455/416 |
| 2015/0019311 A1* | 1/2015 | Lee | ..................... | G06Q 30/0214 705/14.16 |

OTHER PUBLICATIONS

Kotsiantis et al.; "Handling imbalanced datasets: A review", GESTS International Transactions on Computer Science and Engineering, vol. 30, 2006. Downloaded from https://www.researchgate.net/profile/P_Pintelas/publication/228084509_Handling_imbalanced_datasets_A_review/links/0c960517fefa59fa6b000000.pdf.

* cited by examiner

*Primary Examiner* — Philip C Lee
(74) *Attorney, Agent, or Firm* — Schwegman Lundberg & Woessner, P.A.

(57) ABSTRACT

The disclosed embodiments provide a system for propensity-based SMS (Short Message Service) invitation filtering. During operation, the system collects multiple contact numbers associated with multiple invitation requests into a total set of contact numbers. Then, for one or more of the contact numbers, the system determines a propensity for a person associated with the contact number to click on a link in an electronic invitation sent to the contact number and subsequently create an account. Clicking on the link may connect the person to a user community that he or she has been invited to join. Once the propensity has been determined, the system ranks the contact numbers in the total set of contact numbers according to the propensities. Finally, for each contact number in the total set of contact numbers that is ranked above a specified threshold, the system processes an invitation for the contact number.

20 Claims, 5 Drawing Sheets

PROPENSITY-BASED SMS INVITATION FILTERING

BACKGROUND

Field

The subject matter of this application is related to the subject matter in a co-pending non-provisional application by the same inventors as the instant application and filed on the same day as the instant application, entitled "Verifying Effects of Feed Composition on Long-Term Engagement with Content Feeds," having Ser. No. 15/222,391, and filing date Jul. 28, 2016.

Related Art

As social networks continue to expand, it can become increasingly difficult to attract new participants. One of the primary ways in which social networks grow is through invitations from existing members. These existing members can invite specific friends, or upload and invite some or all contacts identified in their entire address books. In addition, many systems allow for invitations to be sent via multiple mediums. However, in many instances, the conversion rate of invitations to actual signups is very low.

Depending on the method used to send the invitations, the organization providing the social network will incur various costs associated with the invitations. Therefore, sending invitations to those contacts, who do not believe the value of the service, results in a low conversion rate of invitations to actual signups, and thus, may carry a significantly high cost. Sending invitations using some of these methods may become cost prohibitive.

Figure 1:
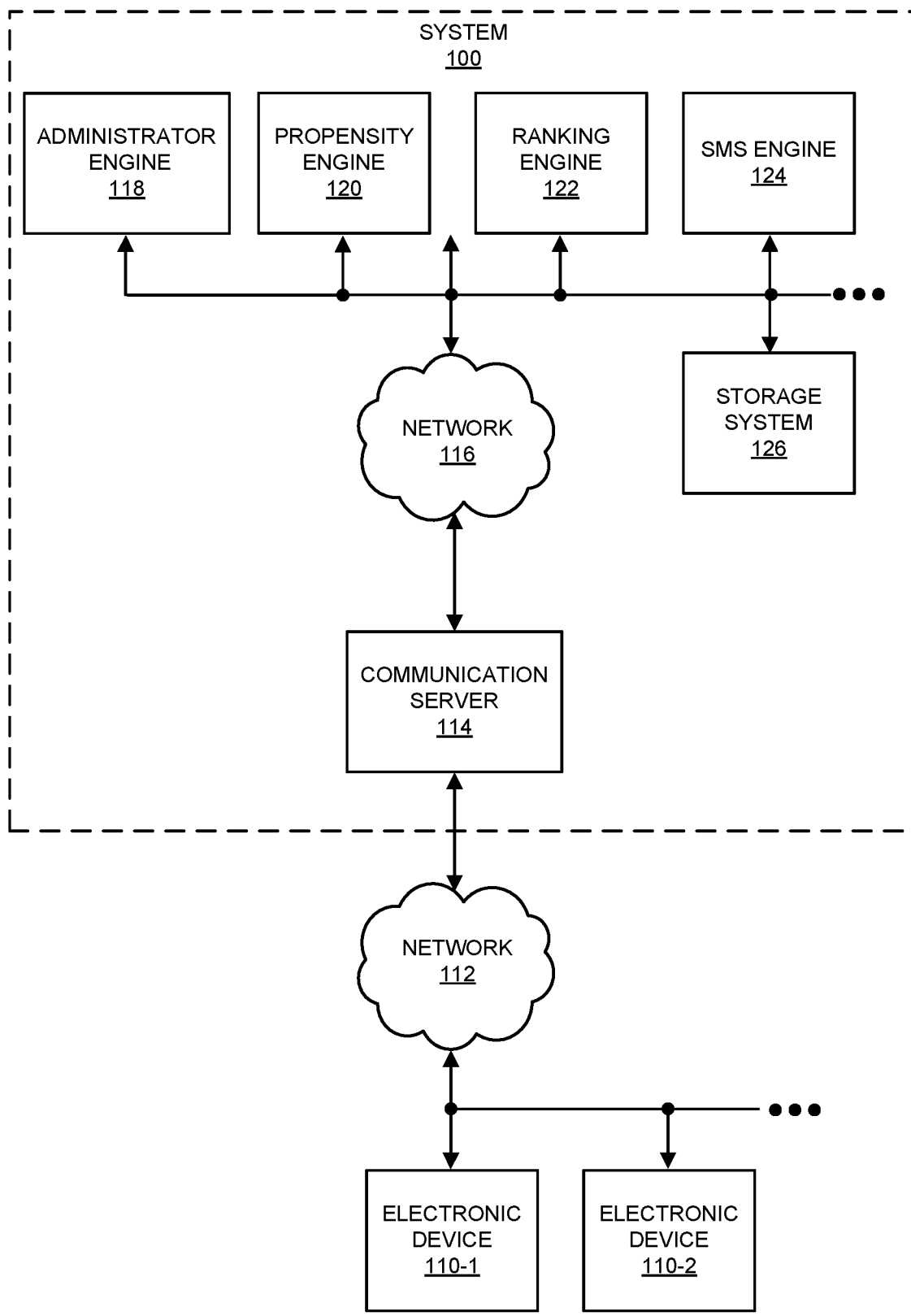
FIG. 1 shows a system for propensity-based SMS invitation filtering in accordance with the disclosed embodiments.

Table 1 shows a non-exhaustive list of features used while determining the propensity for a person to click on a link in an invitation in accordance with the disclosed embodiments.

In the figures, like reference numerals refer to the same figure elements.

DETAILED DESCRIPTION

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing code and/or data now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

The disclosed embodiments provide a method, apparatus and system for propensity-based SMS (Short Message Service) invitation filtering. As members of the user community of an online application or service (such as a social network) provide contact information for individuals whom they would like to invite to join the community, the system determines the propensity for each individual to act upon the invitation, and prioritizes sending invitations to individuals with higher propensities. Although embodiments discussed herein are applied to determine propensities for accepting SMS-based invitations to join a user community, from the following discussion other embodiments may be readily developed for invitations transmitted in other forms (e.g., electronic mail).

A system 100 for filtering invitations to be delivered via SMS messages, based on the recipients' propensity to accept, is shown in FIG. 1. In this system, users of electronic devices 110 (e.g., existing members of the user community) may use a service that is provided, at least in part, using one or more software products or applications executing in system 100. As described further below, the applications may be executed by engines in system 100.

Moreover, the service may be provided, at least in part, using instances of a software application that is resident on and that executes on electronic devices 110. In some implementations, the users may interact with a web page that is provided by communication server 114 via network 112, and which is rendered by web browsers on electronic devices 110. For example, at least a portion of the software application executing on electronic devices 110 may be an application tool that is embedded in the web page, and that executes in a virtual environment of the web browsers. Thus, the application tool may be provided to the users via a client-server architecture.

The software application operated by the users may be a standalone application or a portion of another application that is resident on and that executes on electronic devices 110 (such as a software application that is provided by communication server 114 or that is installed on and that executes on electronic devices 110).

A wide variety of services may be provided using system 100. In the discussion that follows, a social network (and, more generally, a user community) such as an online professional network, which facilitates interactions among the users, is used as an illustrative example. Moreover, using one of electronic devices 110 (such as electronic device 110-1) as an illustrative example, a user of an electronic device may use the software application and one or more of the applications executed by engines in system 100 to interact with other users in the social network.

For example, administrator engine 118 may handle user accounts and user profiles for members of the user community, and propensity engine 120 may determine the propensity for individuals to act upon invitations based on observed features (e.g., features of the invited individuals, of the inviting members, and/or of the invitation or environment in which the invitation is issued). Further, ranking engine 122 may rank and filter the invitations based on the determined propensities, and Short Message Service (SMS) engine 124 may build and process the invitations. Storage system 126 may maintain data structures in a computer-readable memory that may encompass multiple devices; thus, system 126 may be a large-scale distributed storage system.

Propensity-Based SMS Invitation Filtering

In social networks where SMS invitations are sent to individuals immediately upon request by a member of the user community, the rates at which these individuals join the community is typically very low. For example, a typical system that sends out SMS invitations immediately upon request may see relatively few (e.g., only 5-20%) of the invitation recipients clicking on the invitation link embedded in the SMS message. Furthermore, of the few invitation recipients that followed the link, only a fraction (e.g., 10-35%) might continue on to actually create an account with the application or service that hosts the user community. Thus, very few general SMS invitations in this typical system (e.g., less than 10%, less than 5%, etc.) may result in an account being created on the social network, which results in a relatively high cost per acquisition.

It may be noted, however, that once an individual clicks on an invitation link and visits the social network, their propensity to sign up for an account is no longer based on the invitation itself but on their experience from that point forward. Embodiments described herein provide a system that is intended to optimize acceptance of SMS invitations, while reducing invitation cost, by only sending SMS invitations to recipients, who are more likely to show an interest in the invitation, and thus are likely to result in the recipients following the embedded link. This can be accomplished by determining a propensity of a recipient of an invitation for following a link embedded in the invitation by analyzing features associated with the invitation, the recipient of the invitation, and/or the member who initiated the invitation, as described below.

Figure 2:
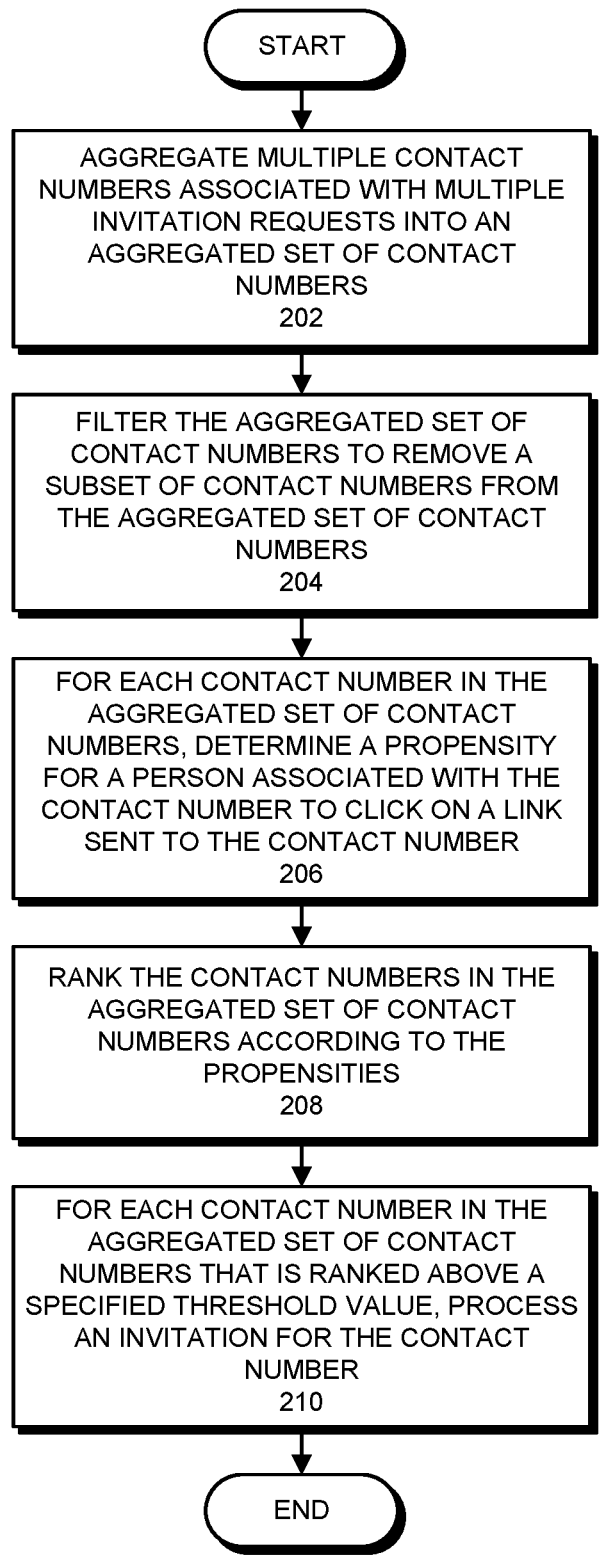
FIG. 2 shows a flowchart illustrating a process of propensity-based SMS invitation filtering in accordance with the disclosed embodiments.

FIG. 2 shows a flowchart illustrating a process of filtering SMS invitations based on recipients' propensities for accepting the invitations, in accordance with the disclosed embodiments. During operation, administrator engine 118 aggregates multiple contact numbers associated with multiple invitation requests into an aggregated set of contact numbers (operation 202). Because the system is attempting to reduce the cost per acquisition by only sending out high quality SMS invitations (e.g., invitations where the propensity for the recipient to click on an embedded link is above a specified threshold), the system aggregates a group of invitations for further analysis. Note that the system may aggregate these invitation requests for a pre-determined amount of time, until a specified time, or until a pre-determined amount of invitation requests have been received.

For example, all invitations initiated by members of the user community during a given time period (e.g., two days, one day, 12 hours) will be evaluated by the propensity algorithm, and thus, some of the invitations will be sent while others will not.

Next, administrator engine 118 optionally filters the aggregated set of contact numbers to remove a subset of contact numbers from the complete aggregated set of contact numbers (operation 204). This subset can include contact numbers for individuals who are already members, individuals who have already received an invitation from the same or a different member (e.g., within a certain period of time), and/or individuals that are on a specified removal list (e.g., previous community members that have been banned from the community).

Once the list has been filtered to remove contact numbers to which no invitation will be sent, for each remaining contact number in the aggregated set of contact numbers, the system determines a propensity for a person associated with the contact number to click on a link within an invitation message sent to the contact number via SMS, and subsequently join the LinkedIn community by creating a new account (operation 206). Note that determining this propensity is described below in the accompanying description of FIG. 3.

Once the propensities have been determined, ranking engine 122 ranks the contact numbers in the aggregated set of contact numbers according to the propensities (operation 208). Finally, for each contact number in the aggregated set of contact numbers that is ranked above a specified threshold value, SMS engine 124 processes an invitation for the contact number (operation 210).

Processing an invitation may involve formatting it (e.g., as just text, with multimedia content) and delivering it to a service provider for delivery to the contact number. The format of an invitation may depend on the recipient's communication device, location, service provider, and/or other factors. For example, some devices cannot handle multimedia content and some service providers may charge recipients for receiving SMS messages (in which case the invitation should be succinct).

Note that the threshold value for determining which invitations will be sent can be periodically adjusted to optimize results. In addition, different countries or different geographic regions may have different threshold values due to different messaging costs. Also note that this threshold can be a specific propensity score, or it can be a percentage of the ranked contact numbers, such as the top 50% of the contact numbers when ranked by propensity.

Determining Propensity

Figure 3:
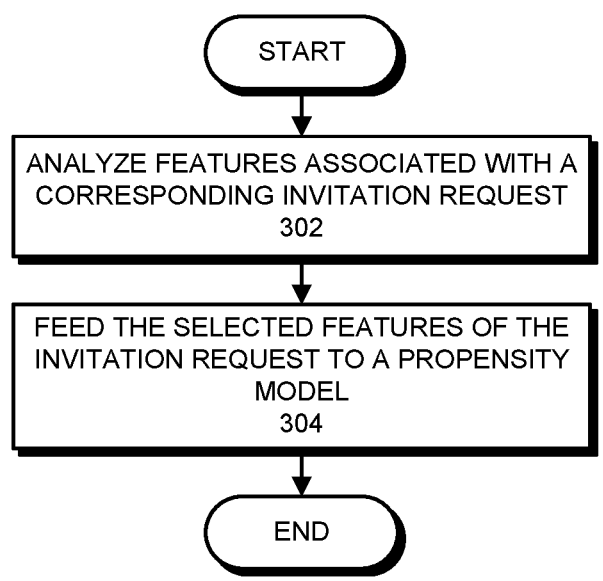
FIG. 3 shows a flowchart illustrating a process of determining the propensity for a person to click on a link in accordance with the disclosed embodiments.

FIG. 3 shows a flowchart illustrating a process of determining the propensity for a person to click on a link in an SMS-based invitation, in accordance with the disclosed embodiments. During operation, the system analyzes features associated with a corresponding invitation request (operation 302). These features generally fall within any or all of three categories: (1) features associated with the inviter, (2) features associated with the invitee, and (3) features associated with the invitation itself and/or the environment in which the invitation will be delivered. A non-exhaustive list of these features is provided below in Table 1.

TABLE 1

| | |
|---|---|
| dialing_area_code | Invitee feature |
| inviter_total_invite_count | Inviter feature |
| dialing_country_code | Invitee feature |
| num_members_having_contact | Invitee feature |
| phone_contact_label | Invitee feature |
| total_sms_invites_sent | Inviter feature |
| sms_invitations_received | Invitee feature |
| days_since_signup | Inviter feature |
| total_email_invites_sent | Inviter feature |
| connection_density | Inviter feature |
| industry | Inviter feature |
| user_interface | Inviter feature |
| local_time | Inviter feature |
| os_group | Inviter feature |
| triangle_connections | Invitee feature |
| is_cross_country | Invitation feature |

For example, the system may analyze the total number of invitations that the inviter has sent ("inviter_total_invite_count"), the invitee's phone number area code ("dialing_area_code"), and the country code to which the invitation will be dispatched ("dialing_country_code"). Each feature listed in Table 1 is useful in determining the propensity of the invitee to click on the link, and they are described below.

The system then feeds the selected features of the invitation request to a propensity model (operation 304) and the model outputs a score indicating the invitee's estimated propensity for clicking on a link and creating an account (within an SMS invitation) that will cause the invitee to join the user community (operation 306). Many different machine learning and pattern recognition algorithms (techniques) are examined, and any suitable model/technique can be used to determine the propensity. Different models may be applied at different times. For example, by continually observing results over time, one model or set of models may be found that provide an optimal trade-off between a loss in the overall number of account creations (e.g., because some invitations are filtered out) and a gain in community members as invitees join the community in response to invitations.

In some embodiments, a selected model is trained using a certain period of data (e.g., one month, three months) which best represents the latest user behavior of SMS invitation recipients. By applying different models to the same training data, and/or using different combinations of features, one or more models and sets of features may be identified that better predict which recipients will respond positively to the invitations (i.e., by clicking on links within the invitations).

In different environments or scenarios, there may be different degrees of imbalance among the dataset or datasets used to train a propensity model. In some such environments, a technique may be applied to alleviate or to compensate for an imbalanced dataset. For example, in some embodiments in which an imbalanced dataset is encountered, an under-sampling technique may be employed (random or directed). In other embodiments, an oversampling technique may be employed, costs/weights assigned to different classes may be adjusted, or some other adjustment may be applied depending on the type of model.

Models employed in different embodiments may include a regression model, artificial neural network, support vector machine, decision tree, random forest, gradient boosting tree, naïve Bayes classifier, Bayesian network, clustering technique, hierarchical model, and/or ensemble model. Yet other models or techniques may be used in other embodiments. Moreover, the same model or separate models may be used to generate propensity scores for different sets of invitee, inviter, and/or invitation features.

Furthermore, decay and weight functions may be applied by the model to favor certain features over others, as well as to favor more recent results over older results. For example, the total number of invitations that a specific member has sent ("inviter_total_invite_count") might be a more important indicator of propensity than the number of days since that member signed up for their account ("days_since_signup"). Invitations requested by a member that has selected specific individuals from their address book might have a higher propensity than invitations requested by a member that has selected their entire address book.

Some other features identified in Table 1 include the number of community members that have the invitee as a contact in their address book or list of contacts ("num_members_having_contact"), the label of recipient phone number that was set by the member. (e.g. home, work, fax, mobile, etc.), ("phone_contact_label"), the total number of invitations the inviter has sent via SMS ("total_sms_invites_sent"), the total number of invitations the inviter has sent via electronic mail ("total_email_invites_sent"), the number of SMS invitations the invitee has received ("sms_invitations_received"), how many first degree connections the inviter has within the user community ("connection_density"), the industry in which the inviter works, which is defined in inviter's (member) profile ("industry"), a user interface through which the inviter interacts with the user community ("user_interface"), an operating system on the inviter's electronic device ("os_group"), the day of the week or other time/date at the recipient's location ("local_time"), the number of inviter's first degree connections also have the recipient's phone number in their address book ("triangle_connections"), and whether the inviter and invitee are in different countries ("is_cross_country"). Other features may be employed in other embodiments.

In some embodiments, contact numbers to which SMS invitations may be sent may be imported from an address book, phonebook, or other contact list of a user, using a technique described in U.S. patent application Ser. No. 15/085,921, which is entitled "Providing Invitations Based on Cross-Platform Information" and is incorporated herein by reference.

Creating and Sending an SMS Invitation

Figure 4:
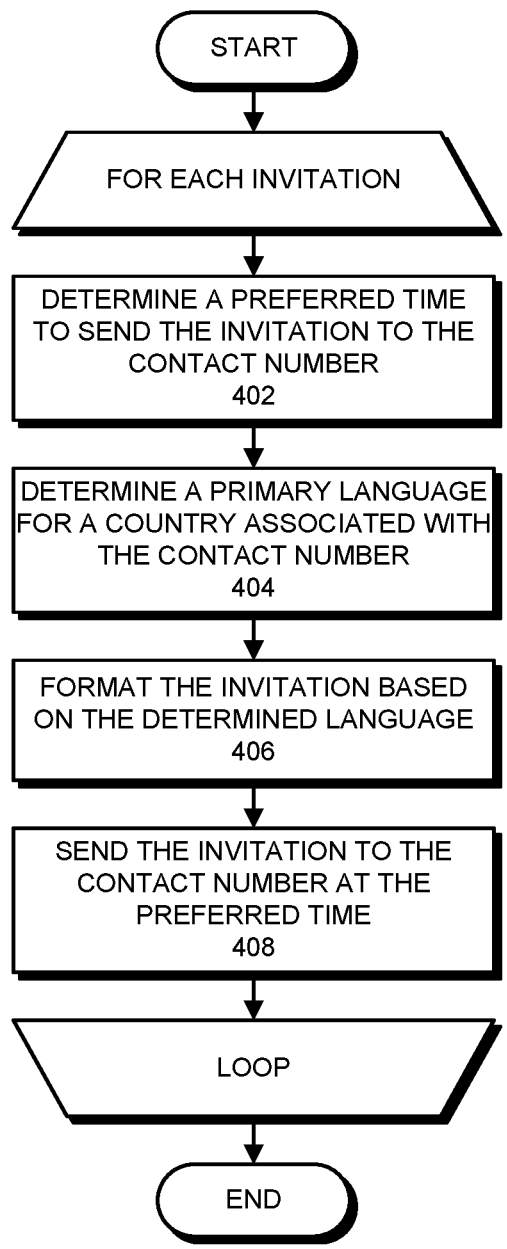
FIG. 4 shows a flowchart illustrating a process of creating and sending SMS invitations in accordance with the disclosed embodiments.

FIG. 4 shows a flowchart illustrating a process of creating and sending an SMS invitation in accordance with the disclosed embodiments. During operation, for each invitation, the system determines a preferred time to send the invitation to the contact number (operation 402). For example, using a previously described model, the system determines a time with the highest likelihood of conversion for sending the invitation. In this example, the conversion rate for signups from SMS invitations would likely be lower if the SMS invitations were sent in the middle of the night (at the invitee's location) as opposed to in the evening. By analyzing or modeling historical data, the system can best determine when to send the invitations.

Next, the system determines a primary language for a country associated with the contact number (operation 404). The system then formats the invitation based on the determined language (operation 406). Finally, the system sends the invitation to the contact number at the preferred time (operation 408).

Note that the system may utilize different models for different feature sets. For example, if the system determines that certain features are predictive of the propensity in the United States for a user to click on an embedded link in an invitation and create an account, but they are not predictive of the propensity in India, then the system may use different models based on the country of the invitee.

As the system sends the SMS invitations, the system also monitors the SMS invitations to determine if the invitees clicked on the embedded links, and if they continued on to sign up for an account on the social network. As the results are observed, the system saves the results to storage system 126 to further refine the models. Note that the system may use different temporal metrics with the models. For example, the system may update the models with all of the results over time, optionally weighting the most recent results more heavily or applying a decay function with regard to elapsed time. In another example, the system may only use results for a predetermined amount of time, such as the last week, the last month, or the last year. Lastly, the filtered invitations are stored in a database, which allows the system to send out the invitations at any time.

System

Figure 5:
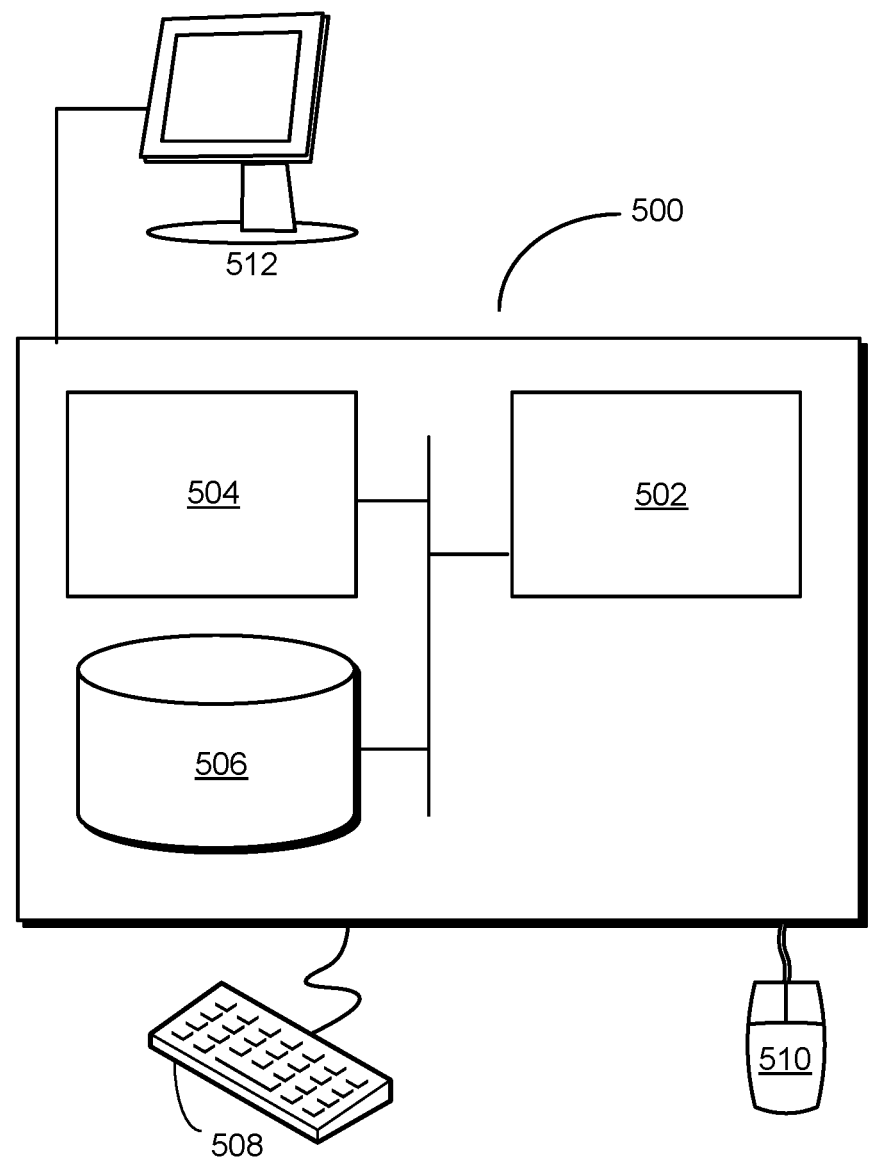
FIG. 5 shows a computer system in accordance with the disclosed embodiments.

FIG. 5 shows a computer system in accordance with the disclosed embodiments. Computer system 500 includes a processor 502, memory 504, storage 506, and/or other components found in electronic computing devices. Processor 502 may support parallel processing and/or multi-threaded operation with other processors in computer system 500. Computer system 500 may also include input/output (I/O) devices such as a keyboard 508, a mouse 510, and a display 512.

Computer system 500 may include functionality to execute various components of the present embodiments. In particular, computer system 500 may include an operating system (not shown) that coordinates the use of hardware and software resources on computer system 500, as well as one or more applications that perform specialized tasks for the user. To perform tasks for the user, applications may obtain the use of hardware resources on computer system 500 from the operating system, as well as interact with the user through a hardware and/or software framework provided by the operating system.

In one or more embodiments, computer system 500 provides a system for propensity-based SMS invitation filtering. Note that one or more components of computer system 500 may be remotely located and connected to the other components over a network. Portions of the present embodiments may also be located on different nodes of a distributed system that implements the embodiments.

By configuring privacy controls or settings as they desire, members of a social network, a professional network, or other user community, that may use or interact with embodiments described herein can control or restrict the information that is collected from them, the information that is provided to them, their interactions with such information and with other members, and/or how such information is used. Implementation of these embodiments is not intended to supersede or interfere with the members' privacy settings.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention.

What is claimed is:

1. A method, comprising:
receiving multiple electronic invitation requests from one or more members of a user community;
aggregating multiple contact numbers associated with the multiple invitation requests into an aggregated set of contact numbers;
for each contact number in the aggregated set of contact numbers, determining a propensity for a person associated with the contact number to click on a link in an electronic invitation that would be sent to the contact number when an associated invitation request is processed, wherein said determining comprises:
  extracting from the associated invitation request, with one or more computer systems, a first set of features associated with a location in which the electronic invitation is to be delivered;
  identifying, with the one or more computer systems, a second set of features associated with an inviter that initiated the associated invitation request, including a number of invitations initiated by the inviter; and
  executing a propensity model on the one or more computer systems, using the first set of features and the second set of features, to yield the propensity;
ranking the contact numbers in the aggregated set of contact numbers according to the propensities; and
for each contact number in the aggregated set of contact numbers that is ranked above a specified threshold, sending an invitation to the contact number.

2. The method of claim 1, wherein determining the propensity for the person associated with the contact number to click on the link in the electronic invitation sent to the contact number in response to the associated invitation request further comprises:
identifying a third set of features associated with the person; and
further applying the propensity model to the third set of features.

3. The method of claim 1, wherein the first set of features includes at least one of:
a country code associated with the contact number; and
a cross-country indicator.

4. The method of claim 1, wherein the second set of features includes at least one of:
a total number of invitations initiated by the inviter;
a number of SMS invitations initiated by the inviter;
a number of email invites initiated by the inviter;
a count of days since the inviter joined a user community associated with the invitation request;
a measure of the inviter's connections within the user community;
an industry in which the inviter is employed;
a user interface of an electronic device operated by the inviter;
a local time of the inviter; and
an OS group.

5. The method of claim 2, wherein the third set of features includes at least one of:
a dialing area code;
within a user community associated with the invitation request, a total count of members connected to the person;
a phone contact label;
a total of SMS invitations received by the person; and
a triangles connection.

6. The method of claim 1, wherein sending the invitation involves:
determining a preferred time to send the invitation to the contact number.

7. The method of claim 1, wherein sending the invitation involves sending the invitation as a Short Message Service (SMS) message.

8. The method of claim 1, further comprising filtering the aggregated set of contact numbers to remove a subset of contact numbers from the aggregated set of contact numbers.

9. An apparatus, comprising:
one or more processors; and
memory storing instructions that, when executed by the one or more processors, cause the apparatus to:
receive multiple electronic invitation requests from one or more members of a user community;
aggregate multiple contact numbers associated with the multiple invitation requests into an aggregated set of contact numbers;
for each contact number in the aggregated set of contact numbers, determine a propensity for a person associated with the contact number to click on a link in an electronic invitation that would be sent to the contact number when an associated invitation request is processed, wherein said determining comprises:
extracting from the associated invitation request a first set of features associated with a location in which the electronic invitation is to be delivered;
identifying a second set of features associated with an inviter that initiated the associated invitation request, including a number of invitations initiated by the inviter; and
applying a propensity model to the first set of features and the second set of features to yield the propensity;
rank the contact numbers in the aggregated set of contact numbers according to the propensities; and
for each contact number in the aggregated set of contact numbers that is ranked above a specified threshold, send an invitation to the contact number.

10. The apparatus of claim 9, wherein
determining the propensity for the person associated with the contact number to click on the link in the electronic invitation sent to the contact number in response to the associated invitation request further comprises:
identifying a third set of features associated with the person; and
further applying the propensity model to the third set of features.

11. The apparatus of claim 9, wherein the first set of features include at least one of:
a country code associated with the contact number; and
a cross-country indicator.

12. The apparatus of claim 9, wherein the second set of features include at least one of:
a total number of invitations initiated by the inviter;
a number of SMS invitations initiated by the inviter;
a number of email invites initiated by the inviter;
a count of days since the inviter joined a user community associated with the invitation request;
a measure of the inviter's connections within the user community;
an industry in which the inviter is employed;
a user interface of an electronic device operated by the inviter;
a local time of the inviter; and
an OS group.

13. The apparatus of claim 10, wherein the third set of features include at least one of:
a dialing area code;
within a user community associated with the invitation request, a total count of members connected to the person;
a phone contact label;
a total of SMS invitations received by the person; and
a triangles connection.

14. The apparatus of claim 9, wherein sending the invitation involves:
determining a preferred time to send the invitation to the contact number.

15. The apparatus of claim 9, wherein sending the invitation involves sending the invitation as a Short Message Service (SMS) message.

16. The apparatus of claim 9, further comprising filtering the aggregated set of contact numbers to remove a subset of contact numbers from the aggregated set of contact numbers.

17. A system, comprising:
an aggregation mechanism comprising a non-transitory computer-readable medium comprising instructions that, when executed, cause the system to:
receive multiple electronic invitation requests from one or more members of a user community; and
aggregate multiple contact numbers associated with the multiple invitation requests into an aggregated set of contact numbers;
a propensity mechanism comprising a non-transitory computer-readable medium comprising instructions that, when executed, cause the system to, for each contact number in the aggregated set of contact numbers, determine a propensity for a person associated with the contact number to click on a link in an electronic invitation that would be sent to the contact number when an associated invitation request is processed, wherein said determining comprises:
extracting from the associated invitation request a first set of features associated with a location in which the electronic invitation is to be delivered;
identifying a second set of features associated with an inviter that initiated the associated invitation request, including a number of invitations initiated by the inviter; and
applying a propensity model to the first set of features and the second set of features to yield the propensity;
a ranking mechanism comprising a non-transitory computer-readable medium comprising instructions that, when executed, cause the system to rank the contact numbers in the aggregated set of contact numbers according to the propensities; and
a processing mechanism comprising a non-transitory computer-readable medium comprising instructions that, when executed, cause the system to, for each contact number in the aggregated set of contact numbers that is ranked above a specified threshold, send an invitation to the contact number.

18. The system of claim 17, wherein
determining the propensity for the person associated with the contact number to click on the link in the electronic invitation sent to the contact number in response to the associated invitation request further comprises:
identifying a third set of features associated with the person; and
further applying the propensity model to the third set of features.

19. The system of claim 17, wherein sending the invitation involves:
determining a preferred time to send the invitation to the contact number.

20. The system of claim 17, wherein sending the invitation involves sending the invitation as a Short Message Service (SMS) message.

\* \* \* \* \*